US006394719B1

(12) United States Patent
Tabellini

(10) Patent No.: US 6,394,719 B1
(45) Date of Patent: May 28, 2002

(54) PROTECTIVE COVER FOR A WORKING PART OF A MACHINE THAT MOVES IN A LINEAR DIRECTION

(75) Inventor: Giorgio Tabellini, Sasso Marconi (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 09/547,969

(22) Filed: Apr. 12, 2000

(30) Foreign Application Priority Data

Apr. 30, 1999 (IT) ...................................... BO9900053 U

(51) Int. Cl.[7] .............................................. B23Q 11/08
(52) U.S. Cl. ........................ 409/134; 74/608; 160/202; 160/222; 408/241 G; 451/451
(58) Field of Search ........................ 451/451; 409/134; 408/241 G; 74/608; 160/202, 182, 185, 222, 223

(56) References Cited

U.S. PATENT DOCUMENTS

| | | | | |
|---|---|---|---|---|
| 5,482,414 A | * | 1/1996 | Hayashi et al. | 409/134 |
| 5,607,269 A | * | 3/1997 | Dowd et al. | 409/134 |
| 6,089,800 A | * | 7/2000 | Tabellini | 409/134 |
| 6,120,222 A | * | 9/2000 | Hiramoto et al. | 409/134 |

FOREIGN PATENT DOCUMENTS

| | | | | |
|---|---|---|---|---|
| IT | BO97A000458 | | 7/1997 | |
| JP | 225777 A | * | 9/1997 | 409/134 |

* cited by examiner

*Primary Examiner*—Daniel W. Howell
(74) *Attorney, Agent, or Firm*—Fay, Sharpe, Fagan, Minnich & McKee, LLP

(57) ABSTRACT

The present invention relates to a protective cover for at least one working part of a machine tool or similar machine, the machine part moving in a linear direction and the cover being designed to follow its movements so as to keep the corresponding zone inside the machine protected. The cover comprises a set of overlapping covering elements in the form of a first covering element that can be connected to the machine at the zone to be protected and a plurality of covering elements that move relative to each other and relative to the first covering element in the same linear direction as the working part of the machine moves. Each covering element has an opening through which a portion of the working machine part or its support can protrude outwards, the opening in the first covering element forming an area to be covered by the remaining covering elements, and the movable covering elements decreasing in size going from the inside to the outside.

15 Claims, 2 Drawing Sheets

PROTECTIVE COVER FOR A WORKING PART OF A MACHINE THAT MOVES IN A LINEAR DIRECTION

BACKGROUND OF THE INVENTION

The present invention relates to protective cover for at least one working part of a machine, especially a machine tool.

The working part of the machine moves in a linear direction and the cover is designed to follow the movements of the working part so as to keep the corresponding zone inside the machine protected.

A similar protective cover is known from Italian patent application BO97A 000458 in the name of the same applicant as the present. The protective cover described in that prior application comprises a set of overlapping covering elements in the form of a first covering element that can be fixed to the machine at the zone to be protected, and a plurality of covering elements that move relative to each other and relative to the fixed covering element in the same linear direction as the working part moves. Each covering element also has an opening through which a portion of the working part of the machine can protrude outwards, where the opening in the first covering element forms an area to be covered by the other covering elements, where the covering elements decrease in size to cover corresponding portions of the main opening in the first covering element, and where the mobile covering elements increase in size going from the inside to the outside.

While being advantageous compared to other solutions, the covering elements or plates making up this protective cover are positioned in such a way that when the cover is fitted vertically and the cover plates move up and down along the vertical, following the movements of the working part of the machine, the transversal edges of the plates are positioned horizontally.

Since the plates gradually increase in size going from the inside to the outside, the edges of the plates located below the working part form a series of upward facing horizontal steps. While the machine tool works, the swarf produced by its working part settles on these steps.

In time, the swarf collects on the protective cover and, besides dirtying the cover itself, eventually makes its way into the machine during the sliding movements of the cover plates, thus dirtying and damaging the moving parts of the machine.

SUMMARY OF THE INVENTION

The present invention therefore aims to provide a protective cover of the type described above but having covering plates that decrease in size going from the inside to the outside.

With the covering plates fitted in this way and the cover moving vertically, the steps formed by the transversal edges of the covering elements located below the working tool face down, and not up as in the known protective cover. Therefore, the transversal edges of the covering elements located below the working tool do not form a receptacle for the falling swarf as they did in the known protective cover.

BRIEF DESCRIPTION OF THE DRAWINGS

The technical characteristics of the invention, according to the above mentioned aims, are described in the claims below and its advantages are apparent from the detailed description which follows with reference to the accompanying drawings, which illustrate a preferred embodiment of the invention without restricting the scope of the inventive concept and in which:

DESCRIPTION OF THE PREFERRED EMBODIMENTS

Figure 1:
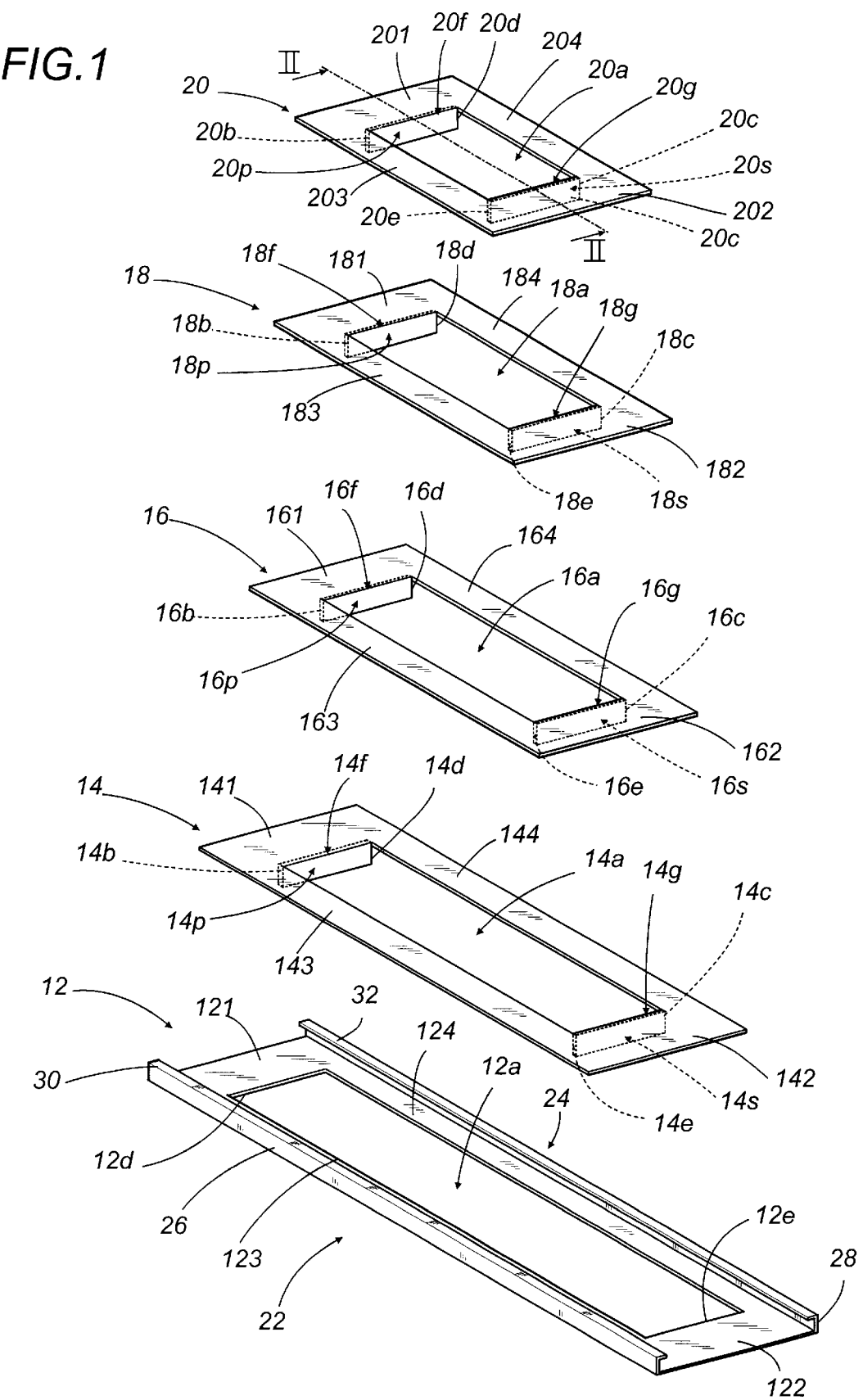
FIG. 1 is an exploded view of a preferred embodiment of a protective cover made according to the present invention.

With reference to the accompanying drawings, the present preferred embodiment 10 of a protective cover can be connected to at least one working part 11 (illustrated schematically in FIG. 2) of a machine, especially a machine tool, said working part 11 being mobile in a vertical direction.

The present protective cover 10 is designed to follow the movements of the working part 11, keeping covered and protected the corresponding internal zone of the machine behind the working part 11.

The protective cover 10 consists of a set of overlapping covering elements, comprising a first covering element 12 that can be fixed to the machine frame at the zone to be protected (this fact not being illustrated in the accompanying drawings) and a plurality of covering elements 14, 16, 18, 20 that move relative to each other and relative to the fixed covering element 12 in the same linear direction as the working part 11 moves.

As clearly shown in FIG. 1, each covering element 12, 14, 16, 18, 20 has an opening 12a, 14a, 16a, 18a, 20a through which a portion of the working machine part 11 or its support can protrude outwards, and the opening 12a in the first covering element 12 forms an area to be covered by the remaining covering elements 14,16,18,20.

Figure 2:
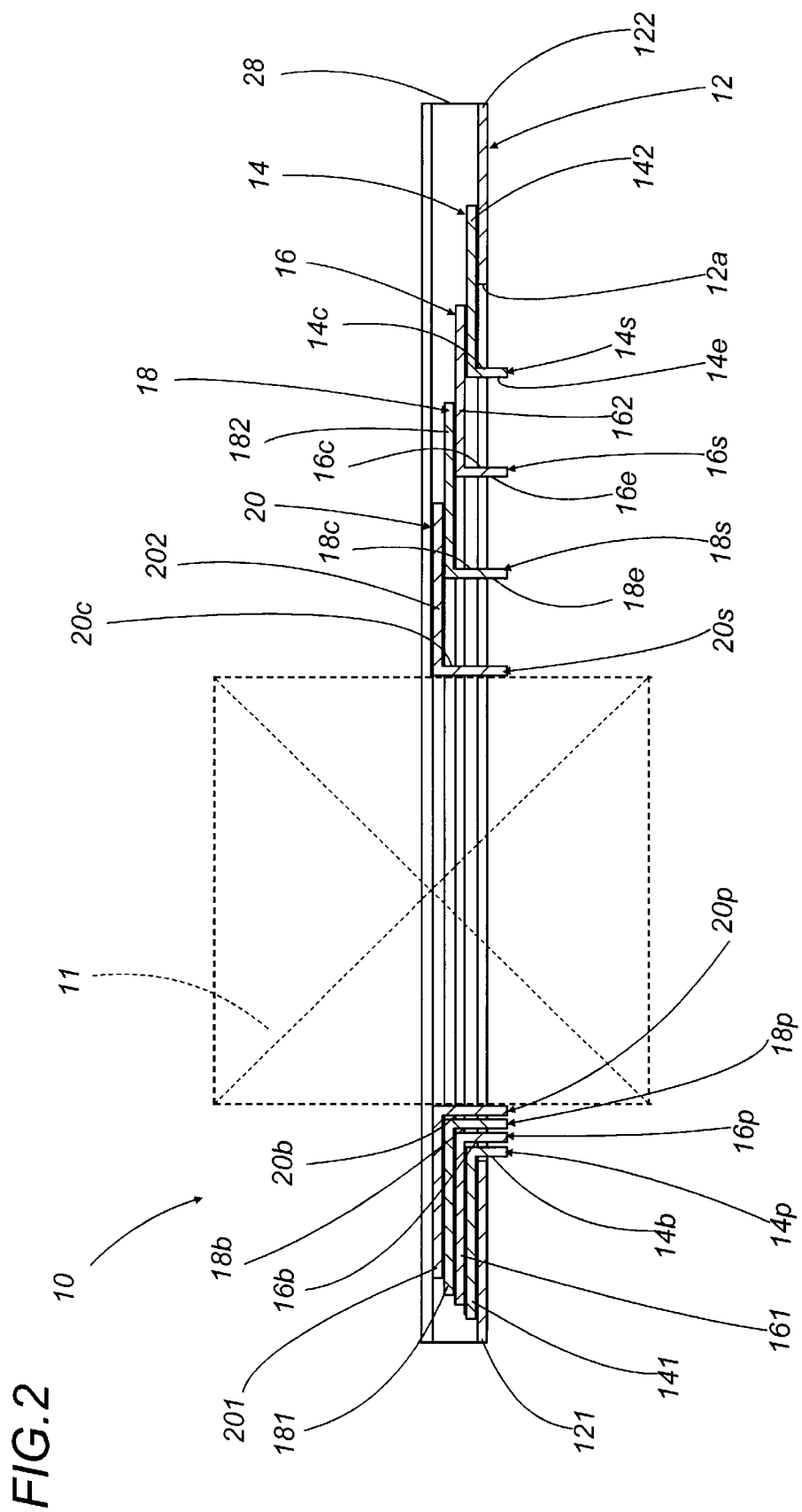
FIG. 2 is a longitudinal cross section through line II—II in FIG. 1, of the preferred embodiment of the protective cover made according to the present invention.

As illustrated in FIGS. 1 and 2, the covering elements consist of plates 12, 14, 16, 18, 20 which are made preferably of metal and which comprise first and second faces 121, 122, 141, 142, 161, 162, 181, 182, 201, 202 located opposite each other lengthways and connected to each other by longitudinal strips 123, 124, 143, 144, 163, 164, 183, 184, 203, 204 (shown in FIG. 1) that bound the corresponding openings 12a, 14a, 16a, 18a, 20a in the covering elements.

As illustrated, the mobile covering elements 14, 16, 18, 20 decrease in size and, in different working positions, cover corresponding portions of the main opening 12a in the first covering element 12.

Advantageously, the mobile covering elements 14, 16, 18, 20 decrease in size going from the inside towards the outside.

Each of the mobile covering elements 14, 16, 18, 20 comprises a first and a second portion 14p, 14s, 16p, 16s, 18p, 18s, 20p, 20s located at opposite longitudinal edges 14f, 14g, 16f, 16g, 18f, 18g, 20f, 20g of the corresponding opening 14a, 16a 18a, 20a and which extend inwards from the corresponding covering element 14, 16, 18, 20.

These first and second portions 14p, 14s, 16p, 16s, 18p, 18s, 20p, 20s form a corresponding pulling surface 14b, 14c, 16b, 16c, 18b, 18c, 20b, 20c that engages with a corresponding stop surface 12d, 12e, 14d, 14e, 16d, 16e, 18d, 18e on the adjacent element 12, 14, 16, 18 so as to enable the covering elements 14, 16, 18, 20 to be extended lengthways and stopped.

As illustrated, the inner transversal faces 20f, 20g of the outermost covering element 20 form the surfaces by which the protective cover is pulled and stopped by the mobile working part 11. The lengthways movement of the protective cover could, however, be obtained by other means.

The pulling and drive surfaces are on longitudinally opposite faces of a corresponding perpendicular portion made by folding a tab on the inner edge 14f, 14g, 16f, 16g, 18f, 18g, 20f, 20g that bounds the opening 14a, 16a, 18a, 20a in the corresponding covering plate.

As illustrated in the accompanying drawings, the fixed element 12 has guide means in which the plurality of mobile covering elements 14, 16, 18, 20 can slide. The guide means comprise a first and a second guide 22, 24 which have a corresponding perpendicular portion 26, 28 designed to guide the covering elements 14, 16, 18, 20 on both sides and which extend from a corresponding longitudinal edge of said fixed element 12 to a corresponding longitudinal portion 30, 32. Said longitudinal portions 30, 32 extend at right angles from the free end of the respective perpendicular portion 26, 28 so as to lie parallel with the faces of the covering elements in such a way as to retain the covering elements 14, 16, 18, 20 in perpendicular direction, while allowing them to slide lengthways.

As shown in FIG. 2, the lateral edges of the mobile covering plates 14, 16, 18, 20 are slidably accommodated between the perpendicular retaining portions 30, 32 of the first and second guides. That means the total thickness of the protective cover is limited.

The invention described can be subject to modifications and variations without thereby departing from the scope of the inventive concept. Moreover, all the details of the invention may be substituted by technically equivalent elements.

What is claimed is:

1. A protective cover adapted for being connected to at least one associated working part of a machine that is mobile in a vertical linear direction, said cover adapted to follow movements of the associated working part, keeping covered and protected a corresponding internal zone of the machine, the protective cover comprising:

a set of overlapping covering elements in the form of a first fixed covering element adapted for attachment to an associated machine frame adjacent an internal zone to be protected; and a plurality of mobile covering elements that move relative to each other and relative to the fixed covering element in the same linear direction as the associated working part moves, each covering element defining an opening through which a portion of the associated working machine part or a support of the associated working machine part can protrude outwards, wherein an opening in the fixed covering element forms an area to be covered by the remaining covering elements, the mobile covering elements decrease in size to cover corresponding portions of the opening in the fixed covering element, and said mobile covering elements decrease in size going from an innermost mobile covering element toward an outermost mobile covering element.

2. The protective cover according to claim 1, wherein each of the mobile covering elements comprises first and second inwardly extending portions located at opposite longitudinal edges of the opening, said first and second portions forming respective pulling surfaces and stop surfaces, whereby each pulling surface engages with a corresponding stop surface on an adjacent mobile covering element so as to enable the mobile covering elements to be extended lengthways and stopped.

3. The protective cover according to claim 2, wherein the first and second inwardly extending portions of each mobile covering element comprise a perpendicular portion made by folding to a perpendicular position a part of an inner edge that bounds the opening in the covering element.

4. The protective cover according to claim 1, wherein the fixed covering element comprises guide means in which the plurality of mobile covering elements slide.

5. The protective cover according to claim 4, wherein the guide means comprise a first and a second guide, both of which have a corresponding perpendicular portion designed to guide the mobile covering elements on both sides and which extend from a corresponding longitudinal edge to a corresponding longitudinal portion at right angles so as to lie parallel with the mobile covering elements.

6. The protective cover according to claim 5, wherein the mobile covering elements consist of plates whose lateral edges are slidably accommodated between the perpendicular retaining portions of the first and second guides and the opposite main portion of the fixed covering element.

7. The protective cover according to claim 1, wherein the mobile covering elements respectively consist of plates, each of which comprises first and second faces located opposite each other lengthways and connected to each other by longitudinal strips that bound the opening.

8. The protective cover according to claim 1, wherein inner transversal faces of the outermost covering element adjacent the opening form the surfaces by which the protective cover is pulled and stopped by the associated mobile working part of the machine.

9. The protective cover according to claim 2, wherein the fixed covering element comprises guide means in which the plurality of mobile covering elements slide.

10. The protective cover according to claim 3, wherein the fixed covering element comprises guide means in which the plurality of mobile covering elements slide.

11. The protective cover according to claim 2, wherein the mobile covering elements respectively consist of plates, each of which comprises first and second faces located opposite each other lengthways and connected to each other by longitudinal strips that bound the opening.

12. The protective cover according to claim 3, wherein the mobile covering elements respectively consist of plates, each of which comprises first and second faces located opposite each other lengthways and connected to each other by longitudinal strips that bound the opening.

13. The protective cover according to claim 4, wherein the mobile covering elements respectively consist of plates, each of which comprises first and second faces located opposite each other lengthways and connected to each other by longitudinal strips that bound the opening.

14. The protective cover according to claim 5, wherein the mobile covering elements respectively consist of plates, each of which comprises first and second faces located opposite each other lengthways and connected to each other by longitudinal strips that bound the opening.

15. The protective cover according to claim 6, wherein the mobile covering elements respectively consist of plates, each of which comprises first and second faces located opposite each other lengthways and connected to each other by longitudinal strips that bound the opening.

* * * * *